United States Patent
Jauer

(10) Patent No.: US 7,941,828 B2
(45) Date of Patent: May 10, 2011

(54) METHOD AND APPARATUS FOR SIMULTANEOUS VIEWING OF TWO ISOLATED DATA SOURCES

(75) Inventor: Richard Albert Jauer, Bridgeton, MO (US)

(73) Assignee: The Boeing Company, Chicago, IL (US)

( * ) Notice: Subject to any disclaimer, the term of this patent is extended or adjusted under 35 U.S.C. 154(b) by 928 days.

(21) Appl. No.: 11/844,412

(22) Filed: Aug. 24, 2007

(65) Prior Publication Data

US 2009/0055934 A1    Feb. 26, 2009

(51) Int. Cl.
G06F 21/04 (2006.01)
G06F 11/30 (2006.01)
G06F 15/16 (2006.01)
G06F 7/00 (2006.01)

(52) U.S. Cl. .............. 726/4; 726/1; 726/17; 726/21; 726/27

(58) Field of Classification Search .............. None
See application file for complete search history.

(56) References Cited

U.S. PATENT DOCUMENTS

| | | | | |
|---|---|---|---|---|
| 5,479,280 | A * | 12/1995 | Kazurov et al. | 349/42 |
| 6,108,787 | A * | 8/2000 | Anderson et al. | 726/5 |
| 2002/0112181 | A1 * | 8/2002 | Smith | 713/201 |
| 2004/0039934 | A1 * | 2/2004 | Land et al. | 713/200 |
| 2008/0114770 | A1 * | 5/2008 | Chen et al. | 707/10 |
| 2009/0265661 | A1 * | 10/2009 | Shuster | 715/797 |
| 2009/0300506 | A1 * | 12/2009 | Drucker et al. | 715/738 |

OTHER PUBLICATIONS

"Network Separation for Information Asset Protection", Network Separation White Paper, 2002, pp. 1-7, Tenix Datagate Pty Ltd.
"Owl Computing Technologies Data Diode Network Interface Card Security Target", Security Target, Jul. 2005, pp. 1-32, Version 1.0, Science Applications International Corporation, Columbia MD.
Jones et al., "Secure Data Export and Auditing Using Data Diodes", pp. 1-5, Department of Computer Science, Iowa City IA.
"SELinux Symposium Case Study: US Coast Guard NetTop2—Thin Client Implementation", Mar. 2007, pp. 1-19, Trusted Computer Solutions, Herndon VA.
U.S. Appl. No. 11/679,486, filed Feb. 27, 2007, Pham.

* cited by examiner

Primary Examiner — Christopher A Revak
(74) Attorney, Agent, or Firm — Yee & Associates, P.C.; Sean Casey

(57) ABSTRACT

A method and apparatus for simultaneously displaying data from different sources. A data processing system includes a display unit, data processing units, and data diodes. The display unit has controls that are capable of generating control signals and the display unit is capable of simultaneously displaying the data from the different sources. The data processing units are arranged in a hierarchy of rankings. Each data processing unit is capable of accessing one of the sources. The data diodes are in the connections carrying control signals from the controls to data processing units and are in connections from one data processing unit to another data processing unit. Data is capable of moving only from a lower ranked data processing unit to a higher ranked data processing unit. Data is prevented from moving from a higher ranked data processing unit from a lower ranked data processing unit.

22 Claims, 5 Drawing Sheets

METHOD AND APPARATUS FOR SIMULTANEOUS VIEWING OF TWO ISOLATED DATA SOURCES

BACKGROUND INFORMATION

1. Field

The present disclosure relates generally to an improved data processing system and in particular to a method and apparatus for processing data. Still more particularly, the present disclosure relates to a method and apparatus for viewing information from different data sources.

2. Background

The Internet is a global network of computers and networks joined together by means of gateways that handle data transfers. On the Internet, any computer may communicate with any other computer with information traveling over the Internet through a variety of languages, also referred to as protocols. The Internet has revolutionized communications and commerce and many businesses have presences online, in the form of websites. Further, many federal, state, and local government agencies also employ Internet sites for free information purposes and transacting business.

In addition to providing information, the Internet also is used for many commercial transactions as well as exchanging information. Businesses, government agencies, and other organizations maintain information that is considered confidential or trade secret. For example, information, such as credit information, financial information, health records, and classified government information are important to safeguard from unauthorized access.

The protection of this and other types of confidential or sensitive information becomes more and more important because of different threats that arise with increased connectivity between different computers and networks. Examples are hackers or other users who obtain unauthorized access to computer systems to steal, tamper with, or corrupt information. Further, in some cases, poor planning of networks results in an unintended dissemination or publication of information that may be considered confidential or trade secret.

Various commercial and government organizations recognize the presence of these and other threats to their information. One step taken to avoid these problems is to implement secure separated networks. These types of networks have no connection to other networks and as a result, provide a highest level of protection against data theft and maximize confidentiality of data. One draw back of an isolated network, however, is a user is prevented from exchanging messages with others outside of the private network and searching or accessing information outside of the network also is prevented. This situation may prevent users from performing valuable research on the Internet.

To gain access to other sources, current solutions include using separate computers for different levels of data. In other words, one computer may be connected to one network, while another computer is connected to the other network. These two computers have no ability to exchange data with each other. For example, one computer may display information from an unprotected source, such as the Internet, while another computer may display data that is present on a secure network that has no external access. With these two displays, a user is able to see both types of data and access information from different sources.

Other solutions include merging data onto a single computer, which creates a video display at the higher of the two security levels. In this type of system, software is used to manage the separation of unsecured and secured data.

By keeping data and video images separated on different computer display systems, more difficulty and time is needed to mentally correlate, understand, and interpret the meanings and implications of the separate data. Further, this type of solution requires two separate display systems.

Merging digital data onto a single computer system provides a possibility that the software system is unable to keep the data separate. In other words, an absence of confidence that sources of publicly available or unclassified data will not be accidentally contaminated with confidential classified data is present. Further, many government agencies and regulations do not authorize or allow for such a solution because of the potential for accidentally leaking classified data in an unclassified report.

Therefore, it would be advantageous to have a method and apparatus that provides for improved data security without the problems discussed above.

SUMMARY

The advantageous embodiments provide a method and apparatus for displaying data from different sources without allowing data from a higher ranked source to reach a lower ranked source. A data processing system includes a display unit, a plurality of data processing units, and a plurality of data diodes. The display unit has a set of controls in which the set of controls are capable of generating control signals and the display unit is capable of simultaneously displaying the data from the different sources. The data processing units are arranged in a hierarchy of rankings in which each data processing unit in the plurality of data processing units is capable of accessing one of the different sources. The plurality of data diodes are located in the connections carrying control signals from the set of controls to the plurality of data processing units and are located in connections from one data processing unit to another data processing unit such that data is capable of moving only from a lower ranked data processing unit to a higher ranked data processing unit and capable of preventing data from a higher ranked data processing unit from entering a lower ranked data processing unit in the different data processing units accessed by the different data processing units.

In another advantageous embodiment, a data processing system comprises a plurality of data processing units, a set of unidirectional links, a display and a set of user input devices. Each data processing unit in the plurality of data processing units is capable of accessing data in a different data domain in a plurality of hierarchically ranked data domains. A unidirectional link in the set of unidirectional links connects one data processing unit to another data processing unit in the plurality of data processing units such that one data processing unit in the plurality of data processing units is capable of sending data only in one direction to another data processing unit in the plurality of data processing units. The display is connected to a particular data processing unit in the plurality of data processing units capable of accessing information from a highest level data domain in the plurality of hierarchically ranked data domains.

In yet another advantageous embodiment, a method is present for processing data. Data is accessed from a plurality of data domains having a hierarchical ranking through a plurality of data processing units in which each data processing unit accesses an associated data domain in the plurality of data domains. Data is passed only in a single direction from a lower ranked data processing unit to a higher ranked data processing unit until a highest ranked data processing unit is reached. Selected data received is displayed from each lower ranked data processing unit on a display by the highest ranked data processing unit.

The features, functions, and advantages can be achieved independently in various embodiments or may be combined in yet other embodiments in which further details can be seen with reference to the following description and drawings.

BRIEF DESCRIPTION OF THE DRAWINGS

The novel features believed characteristic of the different embodiments are set forth in the appended claims. The disclosure itself, however, as well as a preferred mode of use, further objectives and advantages thereof, will best be understood by reference to the following detailed description of an advantageous embodiment when read in conjunction with the accompanying drawings, wherein:

DETAILED DESCRIPTION

Figure 1:
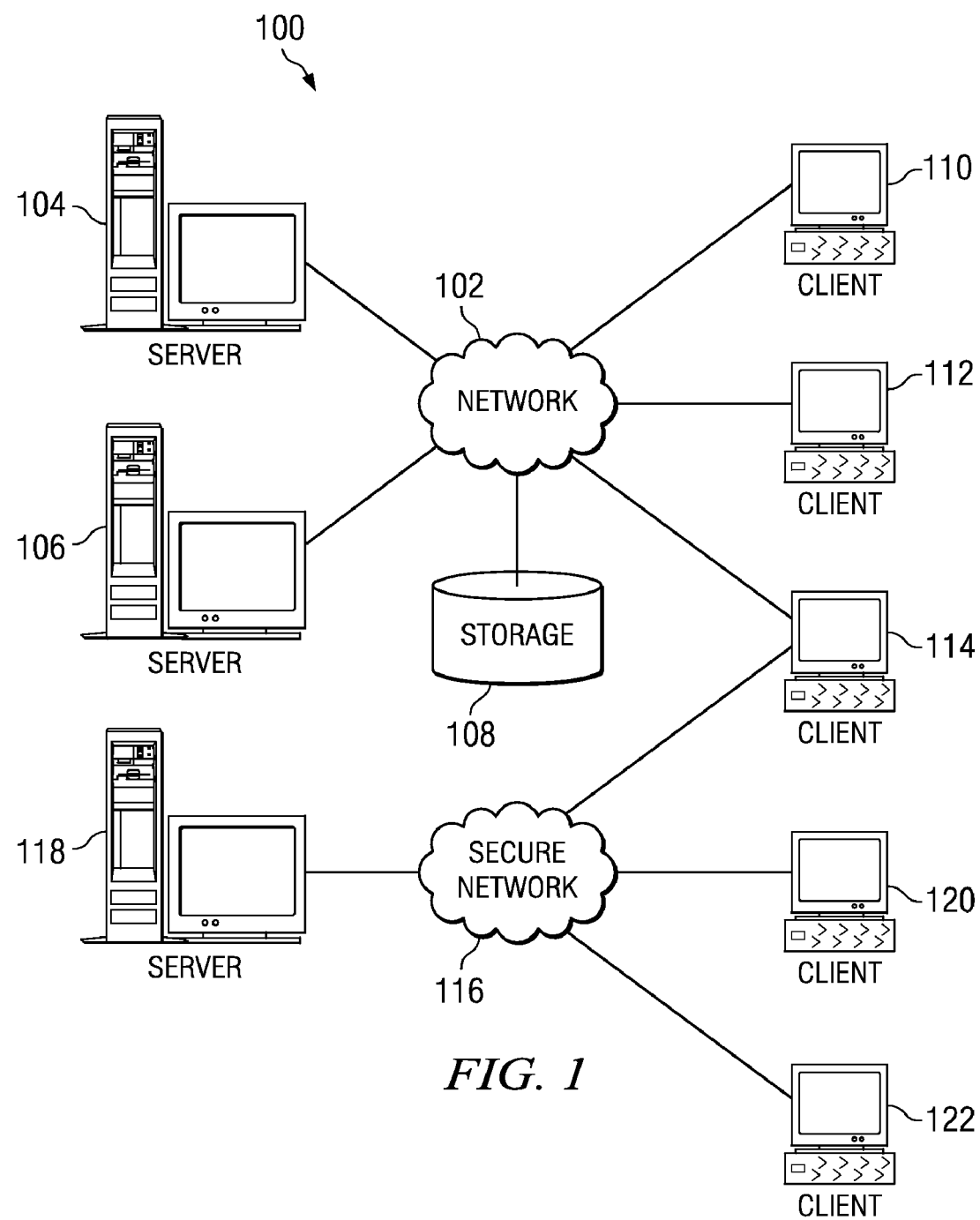
FIG. 1 is a pictorial representation of a network of clients in which an advantageous embodiment may be implemented.
Figure 2:
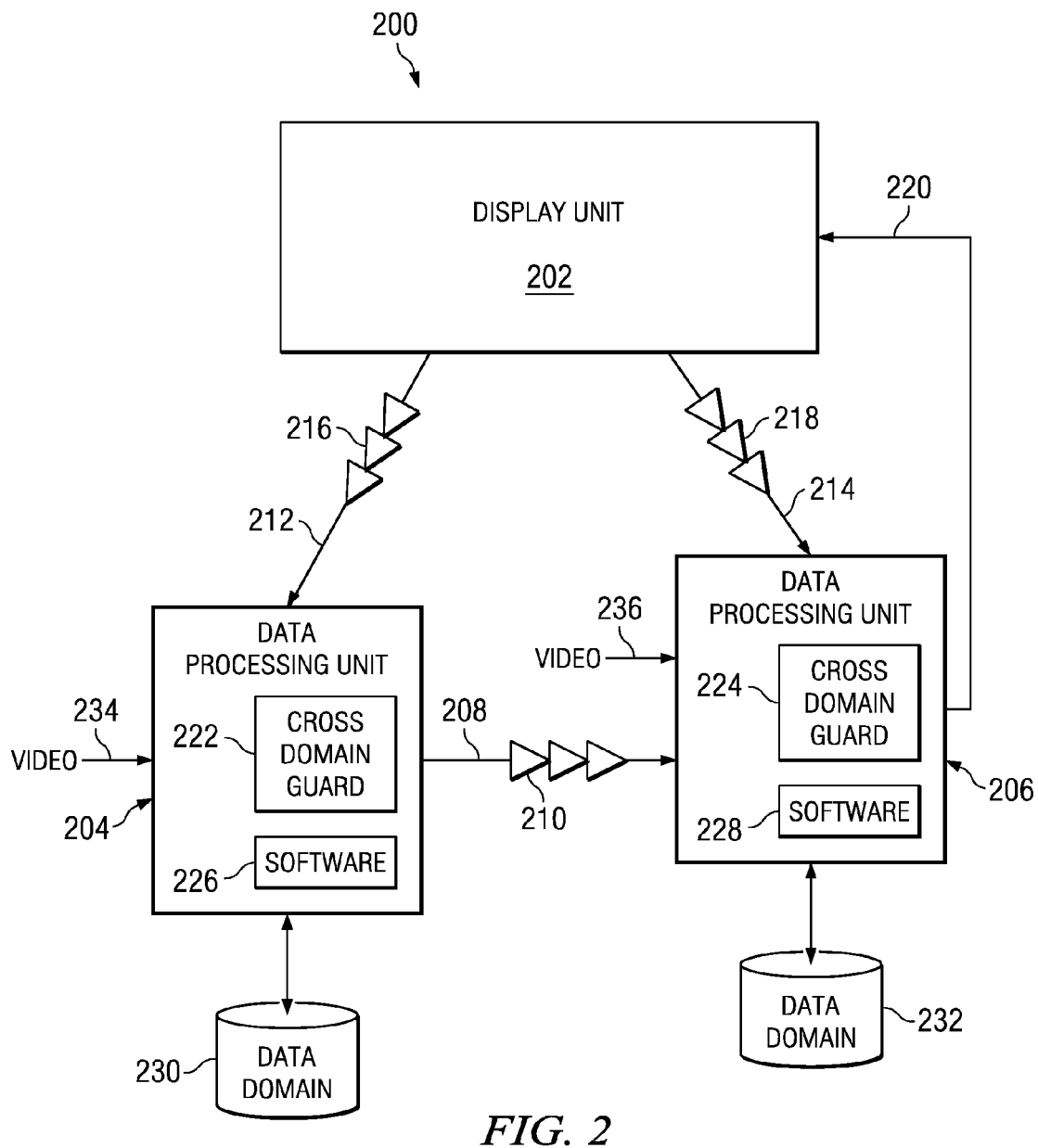
FIG. 2 is a data processing system for simultaneously viewing two isolated data sources in accordance with an advantageous embodiment.
Figure 3:
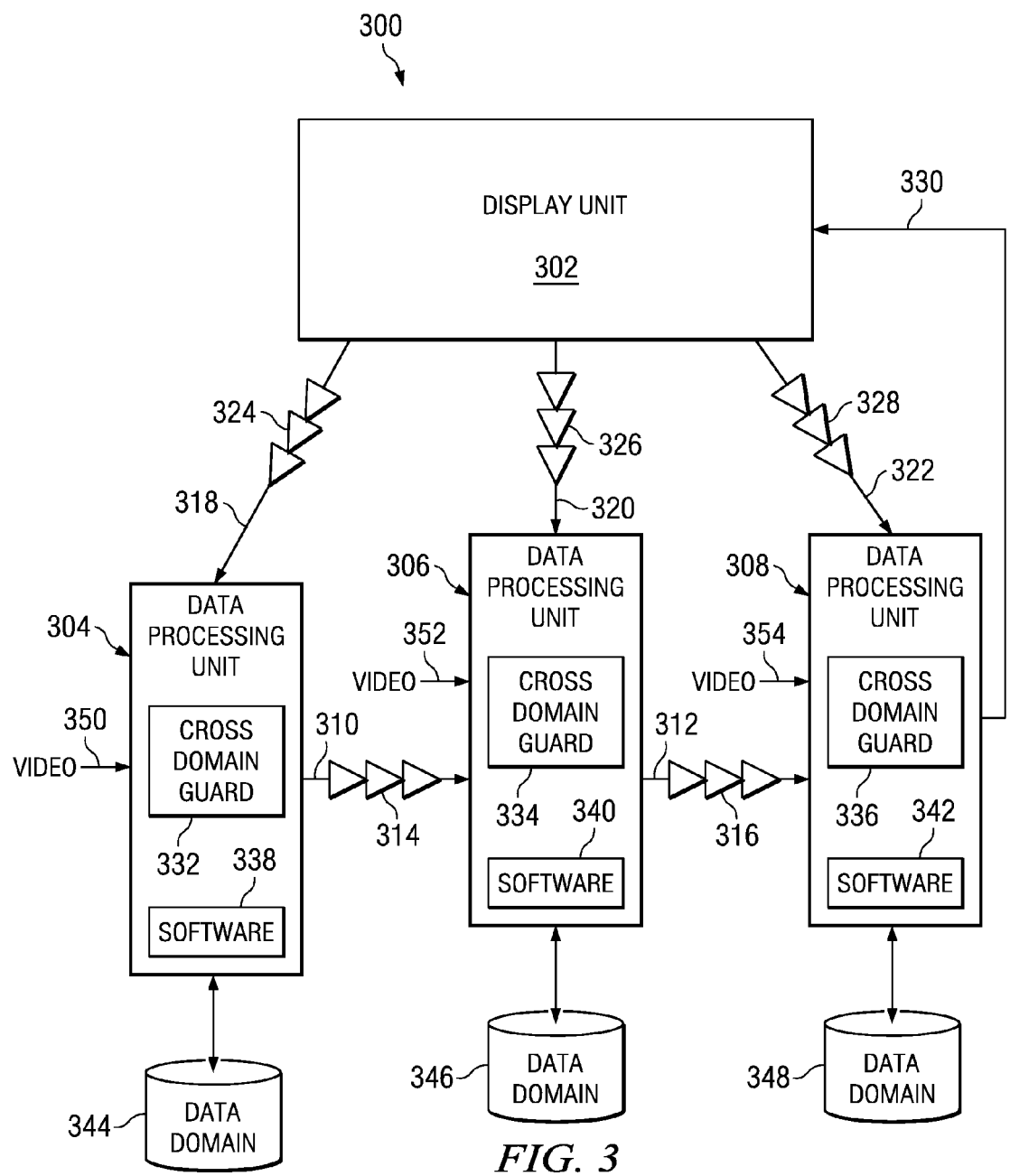
FIG. 3 is a diagram illustrating a data processing system for simultaneously viewing data from multiple isolated sources in accordance with an advantageous embodiment.

With reference now to the figures, and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a representation of a network of clients in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communications links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Additionally, server 104, server 106, and storage 108 may provide repositories or collections of data that may be accessed. This access may include writing or reading data. Further, these servers also may provide services, such as access to programs or applications that may execute on the servers or that may be downloaded to clients 110, 112, and 114.

In the depicted example, network data processing system 100 is the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

In this example, another network data processing system is secure network 116 which includes server 118 and clients 120 and 122. These network components only have connections to secure network 116 and do not have any communications or communications links with any other network. Further, client 114 also is a client of secure network 116, in these examples. The data present in network 102 and secure network 116 are located in different "data domains".

The different advantageous embodiments provide a client with an ability to display information from two sources, such as network 102 and secure network 116 simultaneously on the same display, while maintaining a physical separation between data in network 102 and data in secure network 116. In these examples, the data may include, for example, word processing files, spreadsheets, graphics files, video, and voice communications. Network data processing system 100 may include additional servers, clients, and other devices not shown.

In recognizing the different problems associated with viewing information from different levels of security or confidentiality, the different advantageous embodiments provide a method and apparatus for displaying data from different domains. The data may be displayed simultaneously from the different data domains. In these examples, a data processing system includes data processing units, unidirectional data links, a display, and user input devices. The unidirectional links may be data diodes and the display may be a display integrating the user input devices. The data processing units are capable of accessing data in a different data domain from hierarchically ranked domains.

Further, the set of unidirectional data links are a set of one or more unidirectional data links. Each of these unidirectional data links connects one data processing to another data processing unit in a manner such that one data processing unit is capable of sending data only in one direction to another data processing unit. The display is connected to one of the data processing units that is capable of accessing information from a highest level domain in the hierarchically ranked domains.

The set of user input devices is a set of one or more user input devices and sends control signals or user input to the different data processing units. The arrangement of these different components is made in a manner that provides for an ability to transfer data from a lower data domain to a higher data domain, but prevents moving data from a higher data domain to a lower data domain.

With reference now to FIG. 2, a data processing system for simultaneously viewing two isolated data sources is depicted in accordance with an advantageous embodiment. In this example, data processing system 200 is an apparatus that provides for simultaneous viewing of data from two isolated data sources. Data processing system 200 includes display unit 202, data processing unit 204, and data processing unit 206. Data processing unit 204 is connected to data processing unit 206 through link 208, which includes data diode 210. Display unit 202 may return user input to data processing unit 204 and data processing unit 206 through links 212 and 214. These links include data diodes 216 and 218, respectively. In these examples, a link provides a connection used to exchange information using a wired or wireless medium. Data processing unit 206 sends data in the form of video or other information to display unit 202 through link 220.

A data diode is also referred to as a unidirectional link or connection. A data diode is a hardware device or apparatus that provides for the transfer of data in a single direction. A connection using a data diode or similar hardware is a unidirectional connection. In other words, data may be transmitted only in one direction using a particular link.

In these examples, a data diode may be hardware, such as a network cable or network card that is modified to allow data to travel in only one direction. For example, a fiber optic cable is an example of a wired link. With this type of link, one end of a fiber optic cable may be connected to a transmitter, while the other end is connected only to a receiver. This configuration provides for a transmission of data in only a single direction. A similar setup may be used for physical wire cables or wireless links such that data can only be transmitted in one direction.

Data diodes are commercially available and may be obtained from various sources, such as, for example, Tenix Pty Limited and Owl Computing Technologies, Inc. Of course, other types of unidirectional connections other than data diodes may be used, depending on the particular implementation, as long as these types of connections provide for unidirectional travel of data.

Data processing system 200 also includes cross domain guard 222 in data processing unit 204 and cross domain guard 224 in data processing unit 206. These components provide protection against viruses and malware that may attempt to enter data processing unit 204 and data processing unit 206. Cross domain guard 222 is designed to protect against viruses and other malware that may enter through connections to an unsecured network. Cross domain guard 224 is designed to protect against viruses and malware that may cross over from data processing unit 204 as well as from other sources within the secure network.

Also present in data processing unit 204 and data processing unit 206, are software 226 and software 228. This software may take various forms, depending on a particular implementation. For example, software 226 and software 228 may include applications or programs for performing searches for data, generating documents, generating spreadsheets, and performing analysis of data.

In these examples, data domain 230 and data domain 232 form a hierarchy of domains in which data domain 230 is the lowest level and data domain 232 is the higher level. In a similar fashion, data processing unit 204 and data processing unit 206 are ranked or part of a hierarchy based on their access to data domain 230 and data domain 232. In these examples, the access may include reading and/or writing data. Further, data may include different forms of information. For example, data may include text files, spreadsheets, word processing files, video, images, programs, or audio.

Data processing unit 204 provides access to data domain 230. In these examples, data domain 230 is, for example, unclassified or publicly available data. This data may be located on a hard drive connected to data processing unit 204. In addition or alternatively, data domain 230 may be located on a remote source across a network.

Data processing unit 206 provides access to data domain 232. In the depicted examples, data domain 232 is classified data or confidential. This data may be located on a storage device connected to data processing unit 206 and/or a remote data processing system across a network.

Further, data processing unit 204 may receive video input 234. Video input 234 is unclassified video, which may be live or prerecorded. This type of video may be, for example, a video from a video conference or a news broadcast. Video input 236 provides access to classified confidential video. This video may be, for example, prerecorded or live video. This type of video may be, for example, a video of troop movements or a military operation. In this example, video access through video input 234 is part of data domain 230. Video access through video input 236 is part of data domain 232, in these examples.

In these examples, data diodes 210, 216 and 218 provide for a unidirectional flow of data. The architecture of data processing system 200 provides a physical separation between data domain 230 and data domain 232 while allowing for simultaneous viewing of the data on display unit 202. In this manner, unclassified reports may be generated by data processing systems having access to data domain 230 without possibility of contamination of those reports with classified information. For example, unclassified reports may be generated using data processing unit 204, or some other computer having access to data domain 230. Classified reports, which may include unclassified information, may be generated using data processing unit 206 or other computers having access to data domain 232.

Further, the architecture illustrated in FIG. 2 provides an ability to display information from data domain 230 and data domain 232 at the same time, on display unit 202, while preventing data from data domain 232 from accidentally being sent into the data in data domain 230.

The architecture illustrated for data processing system 200 in FIG. 2 is presented for purposes of illustrating some advantageous embodiments. This illustration is not meant to limit the manner in which different features in different embodiments may be implemented. For example, data diodes 216 and 218 may be unnecessary if feedback is not sent from data processing unit 204 and data processing unit 206 back to display unit 202.

In most cases, data sent back to pointing devices associated with display unit 202 may take the form of indicators, such as, a caps lock indicator, a scroll lock indicator, or initiating a sound to indicate that a user input has been received. This type of return data may not be a concern with respect to allowing data from one domain to cross into another domain. These data diodes, however, are included in these examples to provide additional redundancy.

In these examples, data diodes 210, 216, and 218 may be implemented in hardware in different components, such as within data processing unit 204, data processing unit 206 and display unit 202. In other implementations, these data diodes may be part of the cables connecting the different components. Further, additional redundancy may be achieved. For example, rather than including only data diode 210, both data processing unit 204 and data processing unit 206 may include a data diode within their network or communications port connections between the data processing units.

In this manner, data processing unit 204 may only send data to data processing unit 206 over link 208. Further, data processing unit 206 may only receive data and not return data over link 208.

In these examples, the illustrations of data diodes 210, 216, and 218 are logical representations and not meant to limit the manner in which these data diodes may be implemented within the different components depicted in FIG. 2.

In this manner, the different advantageous embodiments provide an ability to display data on a single display unit from multiple separated information domains or sources without allowing data from a higher ranked source to reach a lower ranked source. A higher ranked data domain has data that is considered more sensitive, confidential, or important than a lower ranked data domain, in these examples.

Further, although only two domains, data domain 230 and data domain 232, are shown to be separated to prevent data in data domain 232 from reaching data in data domain 230, the different advantageous embodiments may be applied to other members of domains. For example, the different advantageous embodiments may be applied to managing three or four domains.

With reference now to FIG. 3, a diagram illustrating a data processing system for simultaneously viewing data from multiple isolated sources is depicted in accordance with an advantageous embodiment. In this example, data processing system 300 is capable of maintaining the separation of data from a higher level domain from a lower level domain. In this example, data processing system 300 includes display unit 302, data processing unit 304, data processing unit 306 and data processing unit 308. As depicted, data processing system 300 also includes links 310 and 312 in which data diodes 314 and 316 are present. These connections provide communications links to send data from a lower data domain to an upper data domain through the different data processing units. In these examples, each data processing unit provides access to a different data domain. Each of the data domains has a different level of ranking, importance, confidentiality, classification, and/or security level.

Display unit 302 sends user input made to controls in or attached to display unit 302 back to data processing units 304, 306 and 308 through links 318, 320, and 322. Each of these links also includes data diodes 324, 326, and 328, respectively. Data processing unit 308 provides a single display of data from all of the data processing units though link 330.

Additionally, cross domain guards 332, 334, and 336 are found in data processing units 304, 306, and 308, respectively. Software 338, 340, and 342 also are found in these data processing units.

Data processing unit 304 provides access to data domain 344; data processing unit 306 provides access to data domain 346; and data processing unit 308 provides access to data domain 348. These different data domains are isolated sources of data, in these examples. In other words, each data domain is isolated from another data domain. In these examples, data domain 344 has the lowest ranking or security level. Data domain 344 may be data, such as that found in public sources on the Internet. Data domain 346 is a higher level or ranked data then data domain 344. Data domain 346 may be, for example, company records, internal business processes, internal calendars, or other proprietary or non-public information for a business or other organization.

Data domain 348 has a higher classification of data domain then data domain 346. Data domain 348 may include data that requires handling through government procedures, such as those in some defense projects. For example, data domain 348 may require a top secret clearance for access. Further, each of the data processing units may receive video inputs, such as video input 350, video input 352, and video input 354.

As can be seen in this depicted example, data processing system 300 may maintain the separation of data between three data domains. Data from data domain 344 may be accessed by data processing unit 304 and sent to data processing unit 308. In turn, data processing unit 306 may retrieve data from data domain 346 and pass the data from both data domains 344 and 346 to data processing unit 308. Data processing unit 308 may access information from data domain 348 and process and/or combine data from these different data domains for display on display unit 302.

The reverse transfer or movement of data, however, is physically prohibited through the use of the data diodes, in these examples. As a result, data from a high level domain, such as data domain 348, cannot be transferred to data processing unit 306. As a result, any possibility of information from data domain 348 reaching or being stored in data domain 346 or in data domain 344 is prevented. In a similar fashion, data from data domain 346 cannot be passed from data processing unit 306 back to data processing unit 304 for inclusion within data domain 344. Of course, additional domains may be managed by adding additional data processing units and unidirectional connections.

Figure 4:
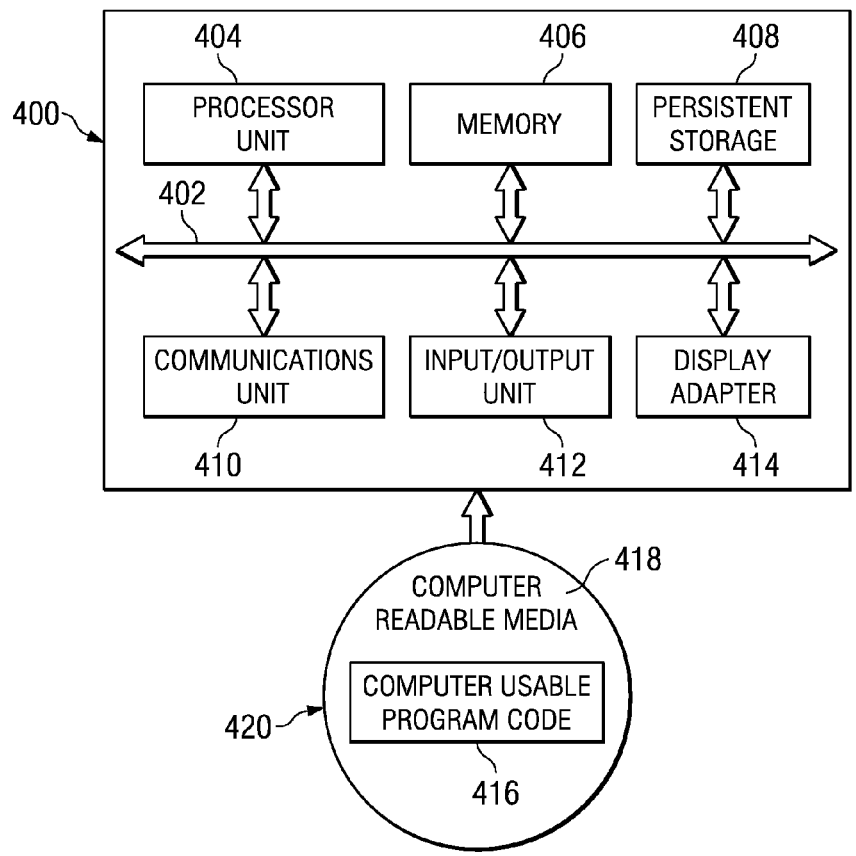
FIG. 4 is a diagram of a data processing unit in accordance with an advantageous embodiment.

Turning now to FIG. 4, a diagram of a data processing unit is depicted in accordance with an advantageous embodiment. In this illustrative example, data processing unit 400 includes communications fabric 402, which provides communications between processor unit 404, memory 406, persistent storage 408, communications unit 410, input/output (I/O) unit 412, and display adapter 414. Data processing unit 400 is an example of a data processing unit that may be used to implement the different data processing units illustrated in FIGS. 2 and 3.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links. In these examples, communications unit 410 may include hardware to send data from one data processing unit to another data processing unit, such as from data processing unit 204 to data processing unit 206 in FIG. 2. In this type of implementation, communications unit 410 may include a data diode within the hardware to only allow data to be sent one way. For example, communications unit 410 may be located within data processing unit 204 in FIG. 2 and only allow data to be sent to data processing unit 206 and not be turned in the other direction. In a different embodiment, data processing unit 206 in FIG. 2 may include a data diode within the hardware that allows data to be received from data processing unit 204 in FIG. 2 but not to be sent back in the other direction. In other embodiments, both data processing units may include a data diode for further redundancy. In yet another embodiment, the data diode may be hardware that is included in a physical cable connecting the two data processing units.

Input/output unit 412 allows for input and output of data with other devices that may be connected to data processing unit 400. For example, input/output unit 412 may provide a connection for user input through a keyboard and mouse. In these examples, input/output unit 412 may have connections to a display unit having an integrated user input device, such as display unit 202 in FIG. 2 or display unit 302 in FIG. 3. The user input device may be a touch screen or connections provided through the display unit for a keyboard or pointing device. In these examples, input/output unit 412 may include data diodes that only allow information to be received by data processing system 400 and not sent back to the user input devices. Further, input/output unit 412 may send output to a printer.

Display adapter 414 provides a mechanism to send display information to a user. In these examples, display adapter 414 may be used to simultaneously display information from multiple data domains on a display unit, such as display unit 202 in FIG. 2 or display unit 302 in FIG. 3. In the depicted examples, display adapter 414 is not needed in every data processing unit within a data processing system. Only the data processing unit associated with or assigned to the highest data domain needs display adapter 414. Other data processing units may include display adapter 414, but those display adapters may not be used. Alternatively, the display adapters may be used to send the data from a lower domain to a higher domain in a display information format. For example, a display video signal, such as NTSC or RS-170 may be used.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as computer usable program code or computer readable program code that may be read and executed by a processor in processor unit 404.

The computer readable program code may be embodied on different physical or tangible computer readable media, such as memory 406 or persistent storage 408.

Computer usable program code 416 is located in a functional form on computer readable media 418 and may be loaded onto or transferred to data processing system 400. Computer usable program code 416 and computer readable media 418 form computer program product 420 in these examples. In one example, computer readable media 418 may be, for example, an optical or magnetic disc that is inserted or placed into a drive or other device that is part of persistent storage 408 for transfer onto a storage device, such as a hard drive that is part of persistent storage 408. Computer readable media 418 also may take the form of a persistent storage, such as a hard drive or a flash memory that is connected to data processing system 400.

Alternatively, computer usable program code 416 may be transferred to data processing unit 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the computer readable program code.

The different components illustrated for data processing unit 400 are not meant to provide architectural limitations to the manner in which different embodiments may be implemented. For example, data processing unit 400 may be implemented using a work station, computer, or other appropriately configured computing device. The different illustrative embodiments may be implemented in a data processing system including components in addition to or in place of those illustrated for data processing system 400. Other components shown in FIG. 4 can be varied from the illustrative examples shown.

For example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
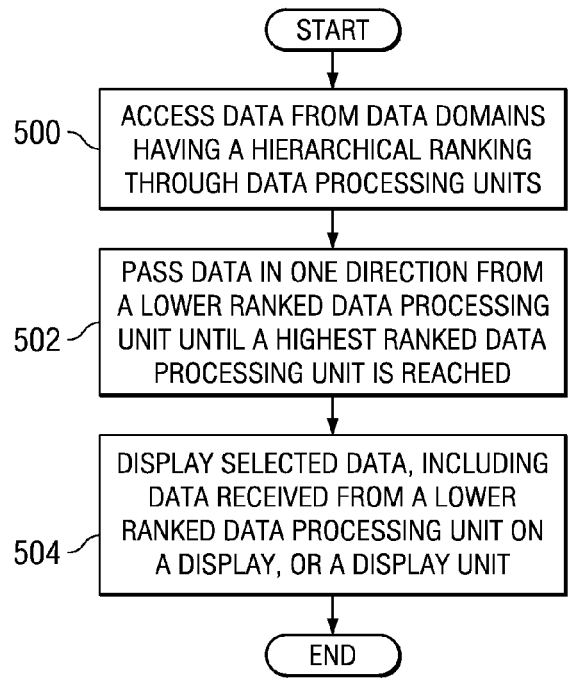
FIG. 5 is a flowchart of a process for accessing data located in different data domains in accordance with an advantageous embodiment.

With reference now to FIG. 5, a flowchart of a process for accessing data located in different data domains is depicted in accordance with an advantageous embodiment. The process illustrated in FIG. 5 may be implemented in a data processing system, such as data processing system 200 in FIG. 2 or data processing system 300 in FIG. 3.

The process begins by accessing data from data domains having a hierarchical ranking through data processing units (operation 500). In operation 500, software, applications, and/or other types of code may be used to access data located at a particular data domain.

For example, a user input may be received to search for a particular key word in documents. This search may be performed by each data processing unit to identify documents corresponding to the request. Alternatively, the user input may be directed towards a document on a particular location and a particular data domain. Alternatively, the request may be for a particular video feed being input into a data processing unit in a particular domain. These data processing units have hierarchies as described above.

Next, data accessed in each data domain is passed in one direction from a lower ranked data processing unit to a higher ranked data processing unit until a highest rank data processing unit is reached (operation 502). In this manner, data is passed only in one direction through the use of data diodes. With these unidirectional connections, data cannot be passed from a higher ranked domain to a lower ranked domain. As a result, more sensitive information may not enter a domain with less security or lower access restrictions. Consequently, unauthorized access from dissemination of high ranked or more secure information does not occur through the movement of data using the data processing system in the different embodiments.

When one data processing unit receives data from a lower ranked data domain, that data processing unit passes that data, plus any data that it accesses, to a higher ranked data domain. This occurs until the highest ranked data domain is reached. The data processing unit for the highest ranked data domain may then process all of the data as needed.

Thereafter, selective data received from each lower ranking data processing unit is displayed with data from a data domain associated with the highest ranked data unit on a display or display unit connected to the highest ranked data unit (operation 504), with the process terminating thereafter. After processing all of the data received, plus any data accessed in the highest ranked domain, selected portions or results from the portions of that data may be displayed after being processed by the data processor unit. For example, portions of a document obtained from a lower ranked data domain may be used with text or documents in a higher ranked data domain and displayed on the display unit.

In another example, spreadsheet data from a lower ranked data domain may be received and processed with spreadsheet data from the higher ranked data domain. The results of this processing may be displayed on the display unit. In another example, weather data or video feeds from a lower ranked data domain may be presented or displayed in the display unit along with other information from the higher ranked data domain.

As a result, data from different ranked domains may be displayed on a single display, while maintaining the separation of data from a higher ranked domain and a lower ranked domain. In other words, although data from a lower ranked domain may be incorporated or placed into a higher ranked domain, data from a higher ranked domain cannot move the opposite direction and enter a lower ranked domain.

Figure 6:
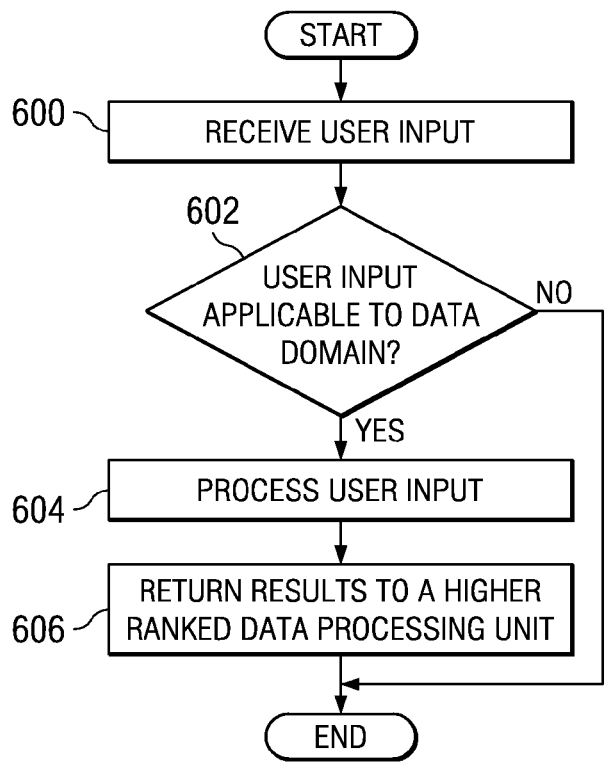
FIG. 6 is a flowchart of a process for handling user input from a set of controls in accordance with an advantageous embodiment.

Turning now to FIG. 6, a flowchart of a process for handling user input from a set of controls is depicted in accordance with an advantageous embodiment. The process in FIG. 6 may be implemented in a data processing system, such as data processing system 200 in FIG. 2 or data processing system 300 in FIG. 3. In particular, this process may be implemented in each data processing unit found in a data processing system, such as the data processing units depicted in FIGS. 2 and 3. In particular, the process may be found or implemented in software executing on these data processing units.

The process begins by receiving the user input (operation 600). In these examples, the user input is received through unidirectional connections from a set of controls. In these examples, the set of controls are integrated with a display. In other embodiments, the set of controls may be separate from the display.

Thereafter, a determination is made as to whether the user input is applicable to the data domain to which the user input is received (operation 602). This determination is made, in this example, because the same user input is sent to each data processing unit in the data processing system. In some cases, the query may be applicable to all of the data processing units because the query may be made throughout each domain. For example, a query for a document having certain key words may be applicable to every domain accessed by the data processing system.

In other examples, the query may be only applicable to a particular data domain. For example, if a path, or location, is present in only a selected domain, then that query may be processed only in that data domain. In another example, the query may be processed in every data domain with no results, or errors, being generated, if the query is not applicable.

If the user input is applicable to the data domain, the process processes the user input (operation 604). The processing may include, for example, executing a query, locating a video feed, or accessing some other data in the domain.

Thereafter, results are returned to a higher ranked data processing unit (operation 606), with the process terminating thereafter. In these examples, results may be, for example, a document, a video feed, or some other file or form of data. As another example, the results may be a live voice or video conference with another user.

With reference again to operation 602, if the user input is not applicable to the data domain, the process terminates. In this manner, each data processing unit may receive the same user input and access information in the domain.

Figure 7:
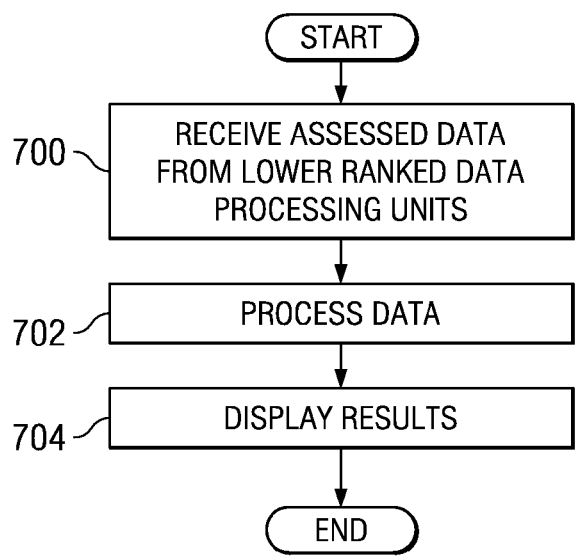
FIG. 7 is a flowchart of a process for processing and displaying data in accordance with an advantageous embodiment.

With reference now to FIG. 7, a flowchart of a process for processing and displaying data is depicted in accordance with an advantageous embodiment. The process depicted in FIG. 7 may be implemented in a data processing system, such as data processing system 200 in FIG. 2 or data processing system 300 in FIG. 3. In particular, this process may be implemented in the highest ranked data processing unit, such as data processing unit 206 in FIG. 2 and data processing unit 308 in FIG. 3. These processes may be implemented in software executing on these data processing units. Alternatively, these processes may be implemented using hardware or a combination of software or hardware.

The process begins by receiving data accessed from lower ranked data processing units (operation 700). After receiving this data, the process processes this data and any other data that may have been accessed by the data processing unit associated with the highest ranked domain (operation 702). Thereafter, results are displayed (operation 704), with the process terminating thereafter.

In these depicted examples, the access of data has been described with respect for retrieving data for use and display in a data processing system. This access also may include the writing of data. With this type of processing of data, if the data is not present on a particular data processing unit, that data is not saved or stored on that data processing unit.

Thus, the different advantageous embodiments provide a method and apparatus for accessing data. Data may be accessed from different data domains through data processing units in which each data processing unit accesses an associated data domain. Data is passed only in a single direction from a lower ranked data processing unit to a higher ranked data processing unit until the highest ranked data processing unit is reached. Selected data, including the data received from each lower ranked data processing unit, is displayed on a display by the highest ranked data processing unit.

In this manner, data from lower ranked data domains may be accessed and used by a data processing unit in a higher ranked data domain in a manner that prevents data from higher ranked data domains from reaching or being incorporated into lower ranked data domains. As a result, with this type of architecture, inadvertent storing of data from higher data domains into lower data domains is avoided. Further, the different advantageous embodiment provide a user an ability to see data from the different data domains on a single screen, as well as processing and viewing results of different analysis of data from different data domains on a single display.

The description of different embodiments has been presented for purposes of illustration and description, and is not intended to be exhaustive or limited to the embodiments in the form disclosed. Many modifications and variations will be apparent to those of ordinary skill in the art. For example, although the different depicted embodiments integrate or attach controls for user input to the display, other embodiments may directly connect these controls to the control units in which data diodes may or may not be used. Further, different advantageous embodiments may provide different advantages as compared to other advantageous embodiments. The embodiment or embodiments selected are chosen and described in order to best explain the principles of the different advantageous embodiments, the practical application, and to enable others of ordinary skill in the art to understand the disclosure for various embodiments with various modifications as are suited to the particular use contemplated.

What is claimed is:

1. A data processing system for displaying data from different sources without allowing data from a higher ranked source to reach a lower ranked source, the data processing system comprising:
   a display unit having a set of controls, the set of controls configured to generate control signals and the display unit configured to simultaneously display the data from the different sources;
   a plurality of data processing units arranged in a hierarchy of rankings, each data processing unit in the plurality of data processing units configured to access one of the different sources; and
   a plurality of data diodes located in connections carrying control signals from the set of controls to the plurality of data processing units and located in connections from one data processing unit to another data processing unit such that data is configured to move only from a lower ranked data processing unit to a higher ranked data processing unit and configured to prevent data from a higher ranked source from entering a lower ranked source in the different sources accessed by the different sources.

2. The data processing system of claim 1 further comprising:
   a plurality of cross domain guards, in which a cross domain guard is located on each of the plurality of data processing units and configured to protect a data processing unit from undesired code from the lower ranked data processing unit.

3. The data processing system of claim 2, wherein the undesired code comprises a malware.

4. The data processing system of claim 1, wherein the set of controls are integrated into the display unit.

5. The data processing system of claim 1, wherein each of the plurality of data processing units comprises:
   a communications fabric;
   a processor unit connected to the communications fabric;
   an input/output unit connected to the communications fabric, wherein the input/output unit receives the control signals from the set of controls; and
   a communications unit connected to the communications fabric, wherein the communications unit is configured to establish a communications link through which to access a source associated with the each of the plurality data processing units.

6. The data processing system of claim 1, wherein the lowest rank source is an Internet.

7. The data processing system of claim 6, wherein a highest ranked source is a private network with an absence of connections to another network.

8. The data processing system of claim 1, wherein the data comprises a first portion of a document and a second portion of the document, wherein the first portion of the document is located in the lower ranked source, and wherein the second portion of the document is located in the higher ranked source.

9. The data processing system of claim 8, wherein the higher ranked data processing unit is configured to process the first portion received from the lower ranked data processing unit and the second portion, and wherein the display unit is further configured to use the first portion and the second portion to display the document.

10. A data processing system comprising:
    a plurality of data processing units each configured to access data in a different data domain in a plurality of hierarchically ranked data domains;
    a set of unidirectional links, wherein a unidirectional link connects one data processing unit to another data processing unit in the plurality of data processing units such that one data processing unit in the plurality of data processing units is configured to send data only in one direction to another data processing unit in the plurality of data processing units; and
    a display connected to a particular data processing unit in the plurality of data processing units configured to access information from a highest ranked data domain in the plurality of hierarchically ranked data domains;
    a set of user input devices; and
    a plurality of unidirectional links connecting the set of user input devices to the plurality of data processing units, wherein only user input can be sent from the set of user input devices to the plurality of data processing units.

11. The data processing system of claim 10, wherein the set of control devices are integrated into the display.

12. The data processing system of claim 10, wherein the set of unidirectional links comprises a set of data diodes.

13. The data processing system of claim 12, wherein the set of unidirectional links comprise at least one of a unidirectional optical fiber, a unidirectional wireless data connection, and a unidirectional wire cable connection.

14. The data processing system of claim 10, wherein each data processing unit in the plurality of data processing units comprises:
    a communications fabric;
    a processor unit connected to the communications fabric;
    an input/output unit connected to the communications fabric, wherein the input/output unit is connected to a particular unidirectional link in the plurality of unidirectional data links connecting the set of user input devices to the each data processing unit in the plurality of data processing units to receive the control signals; and
    a communications unit connected to the communications fabric, wherein the communications unit is configured to establish a communications link through which to access a data domain associated with the each data processing unit in the plurality of data processing units.

15. The data processing system of claim 10, wherein a lowest ranked data domain in the plurality of hierarchically ranked data domains is an Internet.

16. The data processing system of claim 10, wherein the highest ranked data domain in plurality of hierarchically ranked data domains is a private network with an absence of connections to another network.

17. A method for processing data, the method comprising:
    accessing data from a plurality of data domains having a hierarchical ranking through a plurality of data processing units in which each data processing unit accesses an associated data domain in the plurality of data domains, wherein accessing the data is performed using a set of user input devices and a set of data diodes associated with each of the user input devices in the set of user input devices;
    passing data only in a single direction from a lower ranked data processing unit to a higher ranked data processing unit until a highest ranked data processing unit is reached; and
    displaying, by the highest ranked data processing unit, selected data received from each lower ranked data processing unit with data from a data domain associated with the highest ranked data processing unit on a display connected to the highest display unit.

18. The method of claim 17, wherein the accessing step comprises:
receiving a user input requesting data at a data processing unit in the plurality of data processing units to form requested data; and
selectively accessing the associated domain for the requested data through the data processing unit in response to the user input.

19. The method of claim 17, wherein each data processing unit in the plurality of data processing units comprises:
a communications fabric;
a processor unit connected to the communications fabric;
an input/output unit connected to the communications fabric, wherein the input/output unit is connected to a unidirectional link in a plurality of unidirectional data links connecting the set of user input devices to the each data processing unit in the plurality of data processing units receives the control signals; and
a communications unit connected to the communications fabric, wherein the communications unit is configured to establish a communications link through which to access a data domain associated with the each data processing unit in the plurality of data processing units.

20. The method of claim 17, wherein the set of unidirectional links comprises a set of data diodes.

21. The method of claim 17, wherein a lowest rank data domain in the plurality of data domains is an Internet.

22. The method of claim 21, wherein a highest ranked data domain in the plurality of data domains is a private network with an absence of connections to another network.

* * * * *